(12) United States Patent
Li et al.

(10) Patent No.: US 11,180,664 B2
(45) Date of Patent: Nov. 23, 2021

(54) WATERBORNE INORGANIC ANTI-DOODLING CERAMIC PAINT FOR INDOOR WALLS AND PREPARATION METHOD THEREFOR

(71) Applicant: SHANGHAI EXCILON NEW MATERIALS CO., LTD., Shanghai (CN)

(72) Inventors: Lifeng Li, Shanghai (CN); Yuhui Zhang, Shanghai (CN); Jing Zhao, Shanghai (CN); Ning Zhang, Shanghai (CN)

(73) Assignee: SHANGHAI EXCILON NEW MATERIALS CO., LTD., Shanghai (CN)

( * ) Notice: Subject to any disclaimer, the term of this patent is extended or adjusted under 35 U.S.C. 154(b) by 133 days.

(21) Appl. No.: 16/476,224

(22) PCT Filed: Jan. 26, 2018

(86) PCT No.: PCT/CN2018/074249
§ 371 (c)(1),
(2) Date: Jul. 5, 2019

(87) PCT Pub. No.: WO2018/177011
PCT Pub. Date: Oct. 4, 2018

(65) Prior Publication Data
US 2020/0010690 A1    Jan. 9, 2020

(30) Foreign Application Priority Data

Apr. 1, 2017    (CN) .......................... 201710214283.3

(51) Int. Cl.
C09D 5/00    (2006.01)
C09D 183/06    (2006.01)
C09D 7/61    (2018.01)
C09D 7/20    (2018.01)
C09D 7/42    (2018.01)
C09D 7/45    (2018.01)

(52) U.S. Cl.
CPC ............... *C09D 5/002* (2013.01); *C09D 7/20* (2018.01); *C09D 7/42* (2018.01); *C09D 7/45* (2018.01); *C09D 7/61* (2018.01); *C09D 183/06* (2013.01)

(58) Field of Classification Search
CPC .............................. C09D 5/002; C09D 183/06
See application file for complete search history.

(56) References Cited

U.S. PATENT DOCUMENTS

2014/0220345 A1    8/2014    Lin et al.

FOREIGN PATENT DOCUMENTS

| CN | 101240068 | 8/2008 |
| CN | 102746766 | 10/2012 |
| CN | 105778575 | 7/2016 |
| CN | 106009800 | 10/2016 |
| CN | 106189388 | 12/2016 |
| CN | 107099173 | 8/2017 |

*Primary Examiner* — Vickey Nerangis
(74) *Attorney, Agent, or Firm* — Dragon Sun Law Firm, PC; Jinggao Li, Esq.

(57) ABSTRACT

The present disclosure discloses a waterborne inorganic anti-doodling ceramic paint for indoor walls and preparation method thereof; the ceramic paint is a dual-coating paint having an under-coating paint and a surface-coating paint. The advantage effects of the present disclosure is that: the main film-forming materials are inorganic materials, the solvent is mostly deionized water, VOC emission is extremely low, thereby having a characteristics of safety, health and environmental protection; overcoming the shortcomings of multi-components of ceramic paint needs to be aged before use, while the under-coating paint and the surface-coating paint of the present disclosure are all single-component and can be directly used, easily to apply and fast; having an anti-doodling effect, when a marker doodling on the walls, it can be easily erased; the coating has a low surface tension which can isolate the outdoor moisture and prevent the walls from getting wet and mildewed.

12 Claims, No Drawings

WATERBORNE INORGANIC ANTI-DOODLING CERAMIC PAINT FOR INDOOR WALLS AND PREPARATION METHOD THEREFOR

CROSS-REFERENCE TO RELATED APPLICATIONS

This application is a national stage application of PCT Application No. PCT/CN2018/074249. This Application claims priority from PCT Application No. PCT/CN2018/074249, filed Jan. 26, 2018, and CN Application No. 201710214283.3, filed Apr. 1, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the technical field of indoor environmental protection paints, and in particular to a waterborne inorganic anti-doodling ceramic paint for indoor walls and preparation method thereof.

BACKGROUND

Nowadays, the wall paint for domestic indoor decoration in the market is a latex paint, and the film-forming material is mainly styrene-acrylic emulsion, and there is a small amount of vinyl acetate-acrylic emulsion and pure acrylic emulsion, these paints can only play a simple decorative role. Since film-forming materials of the latex paint are organic materials, organic solvents are added more or less from the synthesis of raw materials to the production of the paint, and the coating process, which causes some harm to environment and human body. With the development of the economy, people's requirements for home decoration are getting higher and higher. For painting of walls, it is not only limited by the smoothness of the walls, but also should be considered the problems of health, safety and environmental protection. Children's nature will scribble the walls, which causes great problems for parents. If the stain adheres to the walls, it is not easy to clean. Thus, there is an urgent need for an indoor walls paint that is healthy, safe and environmental protection and having an anti-doodling effect.

According to a search, the existing technology 201510960983.8 discloses an anti-doodling healthy indoor coating waterborne latex paint and a preparation method thereof. The paint achieves the anti-doodling effect by adding a fluorine-containing polymer, however the fluorine-containing polymer is a toxic substance, which is extremely harmful to human body and is not conducive to human health; and the fluorine-containing polymer is very difficult to degrade when discarded, which causing great damage to environment, and many countries are restricting use of fluorinated compound.

SUMMARY

In view of the deficiencies in the existing technologies, an object of the present disclosure is to provide a waterborne inorganic anti-doodling ceramic paint for indoor walls and preparation method thereof.

In a first aspect, the present disclosure provides a waterborne inorganic anti-doodling ceramic paint for indoor walls; the ceramic paint is a dual-coating paint, comprising an under-coating paint and a surface-coating paint.

the under-coating paint includes the following components in percentage by weight:
  35-45% of a silane-modified silica sol,
  15-20% of a solvent,
  0.5-0.6% of a dispersant,
  9-20% of a filler,
  15-30% of a pigment,
  8-15% of a waterborne epoxy resin,
  0.5-1% of a flatting agent;
the surface-coating paint includes the following components in percentage by weight:
  18-25% of a silane,
  65-80% of a solvent,
  0.5-1% of a flatting agent,
  0.2-0.3% of a catalyst,
  0-15% of a pigment,
  0-0.5% of a dispersant.

Preferably, the solvent in the under-coating paint and the surface-coating paint is one or more selected from deionized water, isopropanol, ethyl alcohol and n-butyl alcohol.

Preferably, the pigment in the under-coating paint and surface-coating paint is an inorganic pigment, such as titanium dioxide, manganese iron black, iron oxide red, and the like.

Preferably, the dispersant in the under-coating paint and the surface-coating paint is BYK 180, BYK 190 or BYK 2010, and the like.

Preferably, the flatting agent in the under-coating paint and the surface-coating paint is one or both of methyl silicone oil, hydroxyl silicone oil.

Preferably, the filler in the under-coating paint is one or more selected from mica powder, kaolin, fumed silica, barium sulfate, whisker silicon, hydroxymethyl cellulose, hydroxyethyl cellulose, and bentonite.

Preferably, the silane in the surface-coating paint is a mixture of methytrimethoxysilane, tetraethyl orthoilicate, and epoxy silane.

Further, the silane in the surface-coating paint is a mixture of methyltrimethoxysilane, tetraethyl orthosilicate, and epoxy silane in a weight ratio of (4-4):(4-4):(1-3).

Preferably, the catalyst in the surface-coating paint is one or more selected from formic acid, acetic acid, and hydrochloric acid.

In a second aspect, the present disclosure provides a method for preparing the paint described above, including a preparation of a primer paint and a preparation of a surface-coating paint.

the preparation of the under-coating paint includes steps of:
  preparing raw materials based on the components of the under-coating paint and their weight percentage;
  mixing a silane-modified silica sol, solvent, dispersant, pigment and filler, grinding to obtain a color paste;
  adding a mixture of waterborne epoxy resin and flatting agent to the color paste, after a continuously grinding, filtering to obtain the under-coating paint.

the preparation of the surface-coating paint includes steps of:
  preparing raw materials based on the components of the surface-coating paint and their weight percentage;
  mixing a silane, part of solvent, catalyst and flatting agent, aging a resulting mixture to obtain a mixture A;
  mixing a pigment, dispersant and another part of solvent, grinding a resulting mixture to obtain a mixture B;
  mixing the mixture A with the mixture B, filtering to obtain the surface-coating paint.

Preferably, in the preparation steps of the under-coating paint, the color paste has a fineness ≤20 μm.

Preferably, in the preparation steps of the under-coating paint, the grinding has a time for 1-2 hours, and the continuously grinding has a time for 5-15 minutes.

Preferably, in the preparation steps of the under-coating paint, the grinding equipment specifically uses a sand mill.

Preferably, in the preparation steps of the under-coating paint, the filtering is specifically filtered by using a 200-400 mesh filter cloth.

Preferably, in the preparation of the surface-coating paint, the aging is specifically treated by mixing a silane, deionized water and catalyst, and placing a resulting mixture at 20-30° C., 100-200 rpm for 12-20 hours.

Preferably, in the preparation of the surface-coating paint, the grinding is specifically treated by grinding a resulting mixture obtained by mixing a pigment, dispersant and deionized water for 1-2 hours, so that the mixture has a fineness ≤20 μm.

Preferably, in the preparation of the surface-coating paint, the filtering is specifically filtered by using a 200-400 mesh filter cloth.

Preferably, in the preparation of the surface-coating paint, the mixture A and the mixture B are mixed at a weight ratio of (3-20):1.

Compared with the existing technologies, the present disclosure has the following advantageous effects:

(1) the main film-forming materials are inorganic materials, the solvent is mostly deionized water, VOC emission is extremely low, thereby having a safety, health and environmental protection characteristics;

(2) overcoming the shortcomings of multi-components of ceramic paint needs to be aged before use, while the under-coating paint and the surface-coating paint of the present disclosure are all single-component and can be directly used, and easily to apply and fast;

(3) having an anti-doodling effect, when a marker doodling on the walls, which can be easily erased;

(4) the coating has a low surface tension which can isolate outdoor moisture and prevent the walls from getting wet and mildewed.

DETAILED DESCRIPTION

The present disclosure will be described in detail with reference to specific examples. The following examples will help those skilled in the art to further understand the present disclosure but not limit the present disclosure in any form. It should be noted that a number of variations and modifications may be made by those skilled in the art without departing from the inventive concept of the present disclosure. These all belong to the protection scope of the present disclosure.

In the examples of the present disclosure, the silane-modified silica sol is a main film-forming material, a weight content thereof is limited to 35-45% because if the amount is too much, which will cause the hardness too high and crack on the cement; if the amount is too small, which will cause the pigment base ratio too high off powder; the silane-modified silica sol such as Bindzil CC151, Bindzil CC301 and the like.

In the examples of the present disclosure, a weight content of the dispersant is limited to 0.5-0.6% because if the amount thereof is too small, which will cause the pigment is not well dispersed and the viscosity is large; if the amount is too much, the paint has poor scratch resistance and easy to fall off.

In the examples of the present disclosure, the waterborne epoxy resin is an organic auxiliary film-forming material, and a weight content of the waterborne epoxy resin is limited to 8-15%, because if the amount thereof is too much which will cause no fireproof performance, and if the amount thereof is too small which will cause a poor waterproofness.

In the examples of the present disclosure, the solvent water is deionized water.

In the examples of the present disclosure, the waterborne epoxy resin comprises EP-51, HyPer WE1044, GF-208.

Examples 1-3

Examples 1-3 respectively provide a waterborne inorganic anti-doodling ceramic paint for indoor walls, and the specific components thereof are shown in table

TABLE 1

| Type and content of raw material | | Example 1 | | Example 2 | | Example 3 | |
|---|---|---|---|---|---|---|---|
| | | content | type | content | type | content | type |
| under-coating paint | silane-modified silica sol | 36% | Bindzil CC151 | 35% | Bindzil CC151 | 40% | Bindzil CC301 |
| | solvent | 18% | deionized water | 20% | isopropanol | 15% | ethyl alcohol |
| | dispersant | 0.5% | BYK190 | 0.5% | BYK180 | 0.5% | BYK2010 |
| | filler | 9% | mica powder | 16% | barium sulfate | 20.5% | kaolin |
| | pigment | 26.5% | titanium dioxide | 16% | ferromanganese black | 15% | iron oxide red |
| | waterborne epoxy resin | 9% | EP-51 | 12% | HyPer WE1044 | 8% | GF-208 |
| | flatting agent | 1% | methyl silicone oil | 0.5% | methyl silicone oil | 1% | hydroxyl silicone oil |
| surface-coating paint | silane | 18% | 2:2:1 | 22% | 4:4:1 | 18% | 4:4:3 |
| | solvent | 68.6% | deionized water | 75% | ethyl alcohol | 80% | isopropanol |
| | flatting agent | 1% | methyl silicone oil | 0.5% | methyl silicone oil | 0.5% | methyl silicone oil |
| | catalyst | 0.2% | formic acid | 0.3% | acetic acid | 0.5% | hydrochloric acid |
| | pigment | 12% | titanium dioxide | 2% | ferromanganese black | 0.5% | iron oxide red |
| | dispersant | 0.2% | BYK190 | 0.2% | BYK180 | 0.5% | BYK2010 |

A ration of silane in example 1, example 2, example 3 specifically is: a weight ratio of methyltrimethoxy silane, tetraethyl orthosilicate, and 3-(glycidoxypropyl)trimethoxysilane.

The preparation method of paint provided in the above-mentioned example 1, example 2, example 3 are the same, includes preparation of a under-coating paint and preparation of a surface-coating paint.

(1) the preparation of the under-coating paint includes steps of:
preparing raw materials based on the components as shown in table 1 and their weight percentage;
mixing the silane-modified silica sol, solvent, dispersant, pigment and filler, grinding to obtain a color paste; in the step, the color paste has a fineness ≤20 μm, the fineness is specifically controlled by grinding, and a grinding time can be control in 1-2 hours;
adding a mixture of waterborne epoxy resin, flatting agent to the color paste, after a continuously grinding, filtering to obtain the under-coating paint; in the step, a time of the continuously grinding can be controlled in 5-15 minutes, and the filtering is specifically filtered by using a 200 mesh filter cloth.

In the above steps, an equipment of the grinding is specifically a sand mill.

(2) the preparation of the surface-coating paint includes steps of:
preparing raw materials based on the components of the surface-coating paint as shown in above table 1 and their weight percentage;
mixing a silane, deionized water, catalyst and flatting agent, aging a resulting mixture to obtain a mixture A; in the step, the aging is specifically treated by mixing a silane, deionized water and catalyst, and placing a resulting mixture at 25° C., 100 rpm for 20 hours;
mixing a pigment, dispersant and deionized water, grinding a resulting mixture to obtain a mixture B; in the step, the mixture B has a fineness ≤20 μm, which is specifically achieved by a grinding treatment for 1-2 hours;
mixing the mixture A with the mixture B at a weight ratio of 10:1, filtering to obtain the surface-coating paint; in the step, the filtering is specifically filtered by using a 200 mesh filter cloth.

It should be noted that, the above preparation method can realize the preparation of the under-coating paint and the surface-coating paint under the following conditions:
the filtering is carried out by using a 200-400 mesh filter cloth, an aging condition is aging at 20-30° C., 100-200 rpm for 12-20 hours, the mixture A and the mixture B are mixed at a weight ratio of (3-20):1.

The inventors test the performance of the paints prepared in example 1, 2 and 3, the results show that, three formulated paint products have better effects in crack resistance, non-burning and smokeless, anti-doodling performance, water resistance, etc., and meanwhile, compared with other two examples, example 1 is more effective in terms of crack resistance and cost control, indicating that there are relatively preferred examples within the scope of the present disclosure. The inventors further verified that the following paint formulations have better performances:

The under-coating paint includes components in percentage by weight as follows: 36% of silane-modified silica sol, 18% of solvent, 0.5% of dispersant, 9% of filler, 26.5% of pigment, 9% of waterborne epoxy resin, and 1% of flatting agent.

The surface-coating paint includes components in percentage by weight as follows: 18% of silane, 68.6% of solvent, 1% of flatting agent, 0.2% of catalyst, 12% of pigment, and 0.2% of dispersant.

In order to embody the significant advantages of the limited products of the present disclosure, in the process of the examples of the present disclosure, the inventors also provide comparative examples, specifically as follows:

Comparative example 1: the difference from example 1 is only in that, in the under-coating paint, silane-modified silica sol has a content of 28%, waterborne epoxy resin has a content of 17%.

Comparative example 2: the difference from example 1 is only in that, in the surface-coating paint, silane has a content of 15%, flatting agent has a content of 4%.

Comparative 3: the difference from example 1 is only in that, in the surface-coating paint, 18% of methyltrimethoxysilane, tetraethyl orthosilicate, 3-(glycidoxypropyl) trimethoxysilane have a weight ratio of 1:1:1.

Comparative example 4: the difference from example 1 is only in that, in the under-coating paint, silane-modified silica sol has a content of 28%, waterborne epoxy resin has a content of 17%; in the surface-coating paint, silane has a content of 15%, flatting agent has a content of 4%.

Comparative example 5: the difference from example 1 is only in that, in the surface-coating paint, silance has a content of 15%, flatting agent has content of 4%; 18% of methyltrimethoxysilane, tetraethyl orthosilicate, 3-(glycidoxypropyl) trimethoxysilane have a weight ratio of 1:1:1.

Comparative example 6: the difference from example 1 is only in that, in the preparation of the surface-coating paint, the mixture A and the mixture B are mixed at a weight ratio of 2:1, and an aging condition is aging at 250 rpm for 10 hours.

Comparative example 7: the difference from example 1 is only in that, in the preparation of the surface-coating paint, the mixture A and the mixture B are mixed at a weight ratio of 2:1, and an aging condition is aging at 250 rpm for 10 hours; silane has a content of 15%, and flatting agent has a content of 4%.

The inventors test the performances of example 1 and comparative examples 1-7, the test methods include: the non-burning and smokeless performance is tested by using a flame gun, the anti-doodling performance is tested by using tissue to erase after being written by a marker; the test results are shown in table 2.

TABLE 2

| Performance | Example 1 | Comparative examples | | | | | | |
| | | 1 | 2 | 3 | 4 | 5 | 6 | 7 |
| --- | --- | --- | --- | --- | --- | --- | --- | --- |
| non-burning and smokeless | flame with non-burning and smokeless | flame with smoke | flame with non-burning and smokeless | flame with non-burning and smokeless | flame with smoke | flame with non-burning and smokeless | flame with non-burning and smokeless | flame with non-burning and smokeless |
| anti-doodling | marker with easily erased | marker with easily erased | marker with not easy being erased | marker with not easy being erased | marker with easily erased | marker with not easy being erased | marker with easily erased | marker with cannot be erased | marker with cannot be erased |

TABLE 2-continued

| Performance | Example 1 | Comparative examples | | | | | | |
| --- | --- | --- | --- | --- | --- | --- | --- | --- |
| | | 1 | 2 | 3 | 4 | 5 | 6 | 7 |
| appearance | smooth and flat | coating cracking | surface-coating cracking | surface-coating cracking | coating cracking | surface-coating cracking | shrikage | surface-coating cracking |
| paint quality guarantee priod | 3 months | 1 month | 3 months | 3 months | 3 months | 3 months | 3 months | 3 months |

In conclusion, the present disclosure solves the following technical problems:

(1) Traditional inorganic ceramic paint is a double-component or three-component paint, before being used, several components need to be mixed and aged for a period of time to be used, after aged, the ceramic paint needs to be used up within 48-72 hours, the use method is relatively complicated; while the paint of the present disclosure is a single-component paint and can be directly applied;

(2) the film-forming material of the existing latex paint is an organic material, which is harmful to environment and human body, and is not good for health. The present disclosure relates to an indoor walls paint which is a ceramic paint, and the film-forming material thereof is an inorganic silica sol (i.e., an aqueous solution of silicon dioxide), which has a characteristics of healthy, safe and environmental protection;

(3) The anti-doodling effect of the present disclosure is not achieved by adding a fluoropolymer which is not beneficial to health, but is achieved by —$CH_3$ formed by hydrolysis polymerization of a plurality of silane.

The specific examples of the present disclosure are described above. It should be understood that, the present disclosure is not limited to the specific examples described above, various variants or modifications may be made by those skilled in the art within the scope of the claims, without affecting the essential content of the present disclosure.

What is claimed is:

1. A waterborne inorganic anti-doodling ceramic paint for indoor walls,
   wherein the ceramic paint is a dual-coating paint, comprising an under-coating paint and a surface-coating paint,
   wherein the under-coating paint comprises the following components in percentage by weight:
   35-45% of a silane-modified silica sol;
   15-20% of a solvent;
   0.5-0.6% of a dispersant;
   9-20% of a filler;
   15-30% of a pigment;
   8-15% of a waterborne epoxy resin; and
   0.5-1% of a flatting agent;
   wherein the surface-coating paint comprises the following components in percentage by weight:
   18-25% of a silane;
   65-80% of a solvent;
   0.5-1% of a flatting agent;
   0.2-0.3% of a catalyst;
   0-15% of a pigment, and
   0-0.5% of a dispersant,
   wherein the silane is a mixture of methyltrimethoxysilane, tetraethyl orthosilicate, and epoxy silane in a weight ratio of (4-4):(4-4):(1-3).

2. The waterborne inorganic anti-doodling ceramic paint for indoor walls according to claim 1, wherein in the under-coating paint and the surface-coating paint,
   the solvent is one or more selected from deionized water, isopropanol, ethyl alcohol and n-butyl alcohol;
   the pigment is an inorganic pigment; and
   the flatting agent is one or both of methyl silicone oil and hydroxyl silicone oil.

3. The waterborne inorganic anti-doodling ceramic paint for indoor walls according to claim 1, wherein in the under-coating paint, the filler is one or more selected from mica powder, kaolin, fumed silica, barium sulfate, whisker silicon, hydroxymethyl cellulose, hydroxyethyl cellulose and bentonite.

4. The waterborne inorganic anti-doodling ceramic paint for indoor walls according to claim 1, wherein in the surface-coating paint, the catalyst is one or more selected from formic acid, acetic acid and hydrochloric acid.

5. A method for preparing a waterborne inorganic anti-doodling ceramic paint for indoor walls,
   wherein the ceramic paint is a dual-coating paint, comprising an under-coating paint and a surface-coating paint; wherein the under-coating paint comprises the following components in percentage by weight:
   35-45% of a silane-modified silica sol;
   15-20% of a solvent;
   0.5-0.6% of a dispersant;
   9-20% of a filler;
   15-30% of a pigment;
   8-15% of a waterborne epoxy resin; and
   0.5-1% of a flatting agent;
   wherein the surface-coating paint comprises the following components in percentage by weight:
   18-25% of a silane;
   65-80% of a solvent;
   0.5-1% of a flatting agent;
   0.2-0.3% of a catalyst;
   0-15% of a pigment; and
   0-0.5% of a dispersant,
   wherein the silane is a mixture of methyltrimethoxysilane, tetraethyl orthosilicate, and epoxy silane in a weight ratio of (4-4):(4-4):(1-3),
   wherein the method comprises a preparation of the under-coating paint and a preparation of the surface-coating paint;
   wherein the preparation of the under-coating paint comprises steps of:
   preparing raw materials based on components of the under-coating paint and their weight percentage;
   mixing the silane-modified silica sol, solvent, dispersant, pigment and filler, grinding to obtain a color paste;
   adding a mixture of waterborne epoxy resin and flatting agent to the color paste; and
   continuously grinding and filtering to obtain the under-coating paint;

wherein the preparation of the surface-coating paint comprises steps of:
preparing raw materials based on components of the surface-coating paint and their weight percentage;
mixing the silane, part of solvent, catalyst and flatting agent, and aging a resulting mixture to obtain a mixture A;
mixing a pigment, dispersant and another part of solvent, and grinding a resulting mixture to obtain a mixture B; and
mixing the mixture A with the mixture B, and filtering to obtain the surface-coating paint.

6. The method for preparing the paint according to claim 5, wherein in the preparation steps of the under-coating paint, the color paste has a fineness ≤20 µm; and the filtering is specifically filtered by using a 200-400 mesh filter cloth.

7. The method for preparing the paint according to claim 5, wherein in the preparation of the surface-coating paint, the aging is specifically treated by mixing the silane, part of solvent, and catalyst, and placing a resulting mixture at 20-30° C., 100-200 rpm for 12-20 hours.

8. The method for preparing the paint according to claim 5, wherein in the preparation of the surface-coating paint, the mixture B has a fineness ≤20 µm; and the filtering is specifically filtered by using a 200-400 mesh filter cloth.

9. The method for preparing the paint according to claim 5, wherein in the preparation of the surface-coating paint, the mixture A and the mixture B are mixed at a weight ratio of (3-20):1.

10. The method for preparing the paint according to claim 5, wherein in the under-coating paint and the surface-coating paint,
the solvent is one or more selected from deionized water, isopropanol, ethyl alcohol and n-butyl alcohol; the pigment is an inorganic pigment; and
the flatting agent is one or both of methyl silicone oil and hydroxyl silicone oil.

11. The method for preparing the paint according to claim 5, wherein in the under-coating paint, the filler is one or more selected from mica powder, kaolin, fumed silica, barium sulfate, whisker silicon, hydroxymethyl cellulose, hydroxyethyl cellulose and bentonite.

12. The method for preparing the paint according to claim 5, wherein in the surface-coating paint, the catalyst is one or more selected from formic acid, acetic acid and hydrochloric acid.

* * * * *